United States Patent [19]

Ban et al.

[11] 4,437,029
[45] Mar. 13, 1984

[54] DIRECT CURRENT MOTOR

[76] Inventors: Itsuki Ban, 829, Higashi-Oizumimachi, Nerima-ku, Tokyo; Manabu Shiraki, 4451-171 Shimotsurum, Yamato-shi, Kanagawa-ken; Kazuhito Egami, 2-44-1 Chuo, Nakano-ku, Tokyo, all of Japan

[21] Appl. No.: 312,089

[22] Filed: Oct. 16, 1981

[51] Int. Cl.³ ............................................ H02K 23/26
[52] U.S. Cl. .................................. 310/198; 310/154; 310/234; 310/268
[58] Field of Search ........................ 310/185, 198–208, 310/180, 184, 234, 68 R, 40 MM, 46, 140, 141, 142, 154, 268, 182, 197, 237; 318/439, 138; 322/90

[56] References Cited

U.S. PATENT DOCUMENTS 4,143,288  3/1979  Sato .................................... 310/68 R
4,243,902  1/1981  Ban ..................................... 310/154

FOREIGN PATENT DOCUMENTS 533488  12/1954  Belgium ............................... 310/201
539734   7/1955  Belgium ............................... 310/234
44-4450  2/1969  Japan .................................. 310/198

Primary Examiner—R. Skudy
Attorney, Agent, or Firm—Kenway & Jenney

[57] ABSTRACT

A direct current motor comprising a field magnet provided with 2 mn magnetic poles which are magnetized with the same angular intervals as those of the magnetic poles N and S, where m is an integer of 1 or more, and n is an integer of 3 or more; a magnetic member for closing the magnetic circuit of the magnetic poles of the field magnet; an armature in which m(2n±1) armature coils are arranged with an equal pitch, the armature being directed towards the magnetic poles in the magnetic circuit; electric power supply control device capable of performing the switching of armature current 2 mn (2n±1) times per revolution of the armature; and a rotating shaft for rotatably supporting the armature and one of the magnetic poles, the rotating shaft supported by a bearing disposed in an outer casing of the direct current motor.

4 Claims, 24 Drawing Figures

DIRECT CURRENT MOTOR

BACKGROUND OF THE INVENTION

The present invention relates to a direct current motor provided with a plurality of armature windings disposed around a disc-shaped or cylindrical coreless armature.

Conventionally, a number of motors of the type with an armature core having a plurality of armature windings formed in a lap winding or wave winding manner are widely used. However, when the conventional armature windings are employed in the coreless type motor, various shortcomings are encountered as will be explained by referring to FIGS. 1 and 2. FIGS. 1 and 2 are expanded views of armature windings in the case where conventional armature winding formed in a wave winding manner are employed in a coreless motor. More specifically, FIG. 1 is an expanded view of a wave winding armature comprising five armature coils, provided with a field magnet with six magnetic poles. The filed magnet 1 has magnetic poles 1-1, 1-2, ..., and 1-6, magnetized alternately to N and S with 60 degree angular intervals. A commutator 3 comprises commutator segments 3-1, 3-2, 3-3, 3-4, and 3-5, with 72 degree angular intervals (6/5 the magnetic pole width). An armature 2 is a cross-connected normal winding, with the angular intervals of the electrically conductor portion contributing to the generation of torque in each armature coil set equal to the magnetic pole width. Armature coils 2-1, 2-2, 2-3, 2-4 and 2-5 are each disposed with an equal pitch of an angular interval of 72 degrees (6/5 the magnetic pole width), without being superimposed on each other. Each armature coil is subjected to wave winding connection. The connecting portions of the armature coils 2-1 and 2-3, the armature coils 2-3 and 2-5, of the armature coils 2-5 and 2-2, of the armature coils 2-2 and 2-4, and of the armature coils 2-4 and 2-1 are respectively connected to commutator segments 3-2, 3-4, 3-1, 3-3 and 3-5. To brushes 4-1 and 4-2 is supplied power from D.C. power source positive and negative poles 5-1 and 5-2, respectively. The brushes 4-1 and 4-2 are disposed with 180 degree angular intervals (3/1 the magnetic pole width). In the configuration as shown in FIG. 1, electric current flows in the direction of the arrow, and torque is generated in each armature coil, so that the armature 2 and the commutator 3 are respectively rotated in the directions of the arrows A and B and work as commutator motor. In the example as shown in FIG. 1, the number of the armature coils is so small that the switching of armature current is performed 10 times per revolution (except the singular point) and therefore good commutating characteristics cannot be obtained. Due to the poor commutating characteristics, reverse torque is generated and the operation efficiency and the starting torque are reduced. Furthermore, since the number of armature coils present between the positive pole and the negative poles of the D.C. power source is extremely small, this cannot be used as direct current motor for high voltage. Furthermore, sparking frequently takes place and short-circuit troubles are apt to occur. As a result, the life of the motor is shortened. In order to improve on the above-mentioned shortcomings, it has been proposed to construct the armature coils in multiple layers. Referring to FIG. 2, this will now be explained. FIG. 2 is an expanded view of a wave winding armature comprising 15 armature coils, provided with a field magnet with six magnetic poles. The field magnet 1 is exactly the same as that explained in FIG. 1. A commutator 7 comprises commutator segments 7-1, 7-2, ..., 7-15, with 24 degree angular intervals (2/5 the magnetic pole width). An armature 6 is constructed of a cross-connected normal triple-superimposed wave winding coil, in which the angular intervals of the conductor portions thereof contributing to the generation of torque in each armature coil are equal to the magnetic pole width. The armature coils 6-1, 6-2, ..., 6-15 are arranged, superimposing on each other, in multiple layers, with an equal pitch of 24-degree angular intervals (2/5 the magnetic pole width). Each armature coil is subjected to wave winding connection. The respective connecting portions of the armature coils 6-1 and 6-7, of the armature coils 6-7 and 6-13, of the armature coils 6-13 and 6-4, of the armature coils 6-4 and 6-10, and of the armature coils 6-10 and 6-1 are connected to commutator segments 7-4, 7-10, 7-1, 7-7 and 7-13. The respective connecting portions of the armature coils 6-2 and 6-8, of the armature coils 6-8 and 6-14, of the armature coils 6-14 and 6-5, of the armature coils 6-5 and 6-11, and of the armature coils 6-11 and 6-2 are connected to commutator segments 7-5, 7-11, 7-2, 7-8 and 7-14. The respective connecting portions of the armature coils 6-3 and 6-9, of the armature coils 6-9 and 6-15, of the armature coils 6-15 and 6-6, of the armature coils 6-6 and 6-12, and of the armature coils 6-12 and 6-3 are connected to commutator segments 7-6, 7-12, 7-3, 7-9 and 7-15. As mentioned previously, since the armature 6 is of the cross-connected normal triple wave winding type, there are disposed three pairs of brushes. A positive pole 5-1 and a negative pole 5-2 of DC power source respectively supply power to the brushes 4-1 and 4-2. A positive pole 5-3 and a negative pole 5-4 of DC power source respectively supply power to the brushes 4-3 and 4-4. A positive pole 5-5 and a negative pole 5-6 of DC power source respectively supply power to the brushes 4-5 and 4-6. The angular intervals of those brushes are 60 degrees (the magnetic pole width). In the configuration shown in FIG. 2, electric current flows in the direction of the arrow and torque is generated in each armature coil, so that the armature 6 and the commutator 7 respectively rotate in the directions of the arrows A and B and constitute a commutator motor. In the commutator motor shown in FIG. 2, the armature coils are superimposed in multiple layers and, therefore, the armature is thick. That thickness of the armature significantly reduces the effective magnetic field of the field magnet which passes through the armature. As a result, the motor efficiency and starting torque are decreased. In order to eliminate those shortcomings, the prior art effort has been directed to decreasing the thickness of the conductor portions contributing to the generation of torque. However, this process for decreasing the thickness of the conductor portions is performed by press molding, and accordingly is often accompanied by such defects as breaking and short-circuiting of the armature coils. Further, since the phase relationship between the armature coils cannot be positively held in the desired state at the time the coils are arranged, correct phase relationship between the windings is liable to be distorted. Accordingly, such prior art DC motors are costly and cannot be mass produced.

Another prior art technique used for conventional cylindrical coreless DC motors, for avoiding superimposition of the opposite edge portions of the armature coils on each other, requires that the insulated wire be wound in alignment, turn by turn, alternately at an angle of about 180 degrees, so that a cylindrical armature is formed, with the entire width of winding, or part thereof slanting with respect to the rotating axis. This technique, however, also is costly and cannot be used for mass-production.

Further, in Japanese Patent Publication Sho 44-4450, there is disclosed a DC motor having armature coils with ±1 magnetic pole for a field magnet with 4 or more magnetic poles, and commutator segments, the number of which is two times the number of the armature coils.

In the case where a field magnet with 4 magnetic poles is employed, the motor efficiency and the starting torque are high. However, in the case where a field magnet with 6 or more magnetic poles is employed and the number of commutator segments is two times the number of the armature coils, reverse torque is generated and, accordingly, the motor efficiency and the starting torque are significantly decreased.

SUMMARY OF THE INVENTION

The above-described drawbacks in the prior art motors have been successfully eliminated by the present invention.

A primary object of the present invention is to provide a DC motor with high efficiency, which is simplified in structure, suitable for mass production and inexpensive, and from which the above-described conventional shortcomings are eliminated.

Another object of the present invention is to provide a DC motor of the type described above, with the commutator thereof reduced in thickness, and with the commutating characteristics thereof improved, capable of attaining high torque and high motor efficiency.

In order to attain these objects, the present invention provides a DC motor provided with $m(2n \pm 1)$ armature coils for a field magnet with $2mn$ magnetic poles (where m is an integer of 1 or more and n is an integer of 3 or more), and with power supply control means capable of switching the armature current $2mn(2n \pm 1)$ times per revolution of the amature.

These and other objects of the invention will become apparent from the following description of embodiments thereof when taken together with the drawings.

DETAILED DESCRIPTION OF THE PREFERRED EMBODIMENTS

Figure 3:
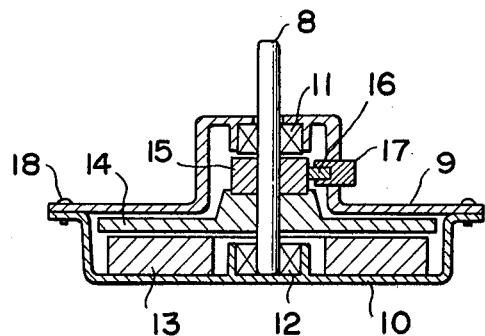
FIG. 3 is an explanatory view of the construction of a commutator motor according to the present invention.

FIG. 3 is a sectional view of a commutator motor with a disc-shaped commutator. In the figure, a bearing 12 is fixed to a casing 10 made of press-formed soft steel. Further, a casing 9 made of press-formed soft steel is secured to the casing 10 by screws 18, forming a magnetic circuit therebetween. A bearing 11 is fixed to the casing 9. A rotating shaft 8 is supported by the bearings 11 and 12. One end of the rotating shaft 8 is in pressure contact with the casing 10. A cylindrical field magnet 13, with magnetic poles N and S thereof magnetized in the axial direction of the rotating shaft 8, is secured to the casing 10. To the rotating shaft 8, there are fixed an armature 14 and a commutator 15 serving as power supply control means for the armature 14, which are molded integrally. The armature 14 is located in a field air gap between the casing 9 and the field magnet 13. Reference numeral 17 indicates a brush support for supporting brushes 16 which are in contact with the commutator 15, which serves as power supply control means.

Referring to FIGS. 4 to 15, embodiments of the above-described commutator motor provided with a disc-shaped commutator, to which the present invention is applied, will now be explained.

Figure 1:
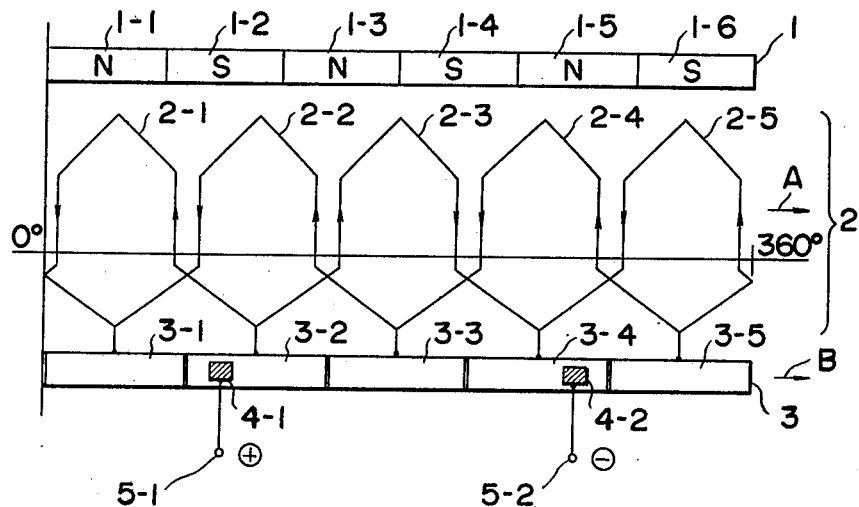
FIG. 1 and FIG. 2 are expanded views of conventional field magnets and wave winding armatures.
Figure 2:
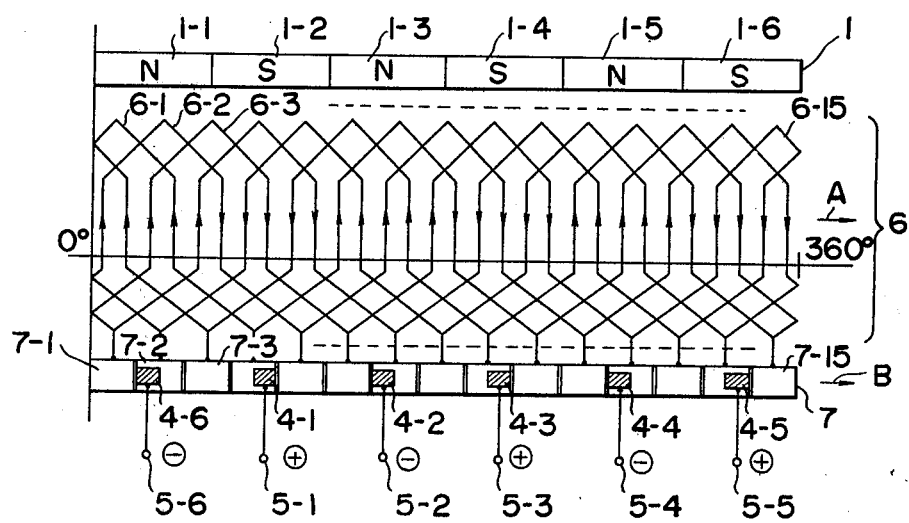
Figure 4:
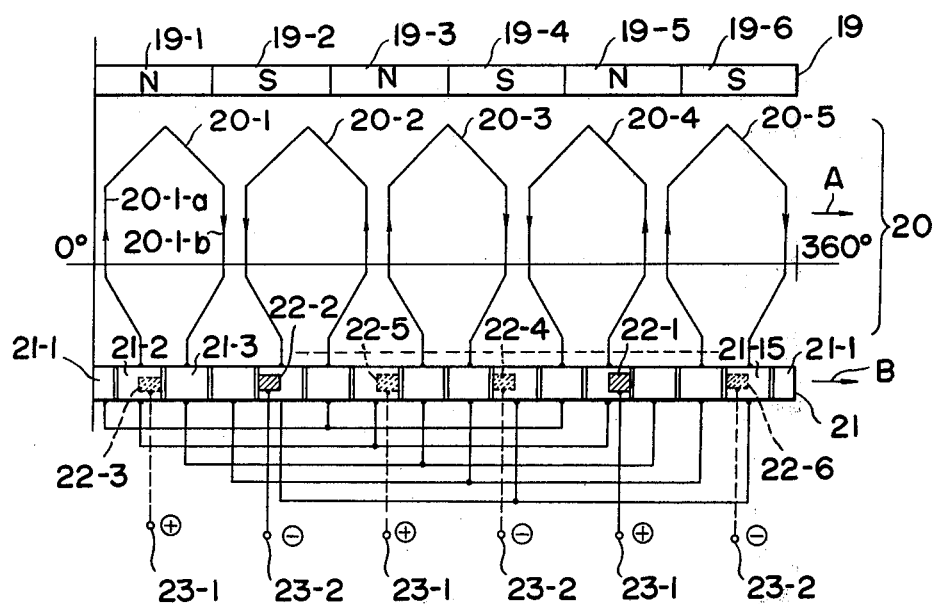
FIGS. 4, 5 and 6 are expanded views of examples of field magnets and armatures for use in a commutator motor according to the present invention.
Figure 7A:
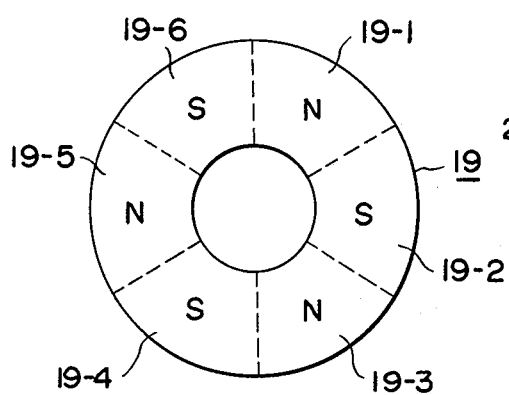
FIG. 7(a) is an expanded view of the field magnets shown in FIGS. 4, 5 and 6.
Figure 7C:
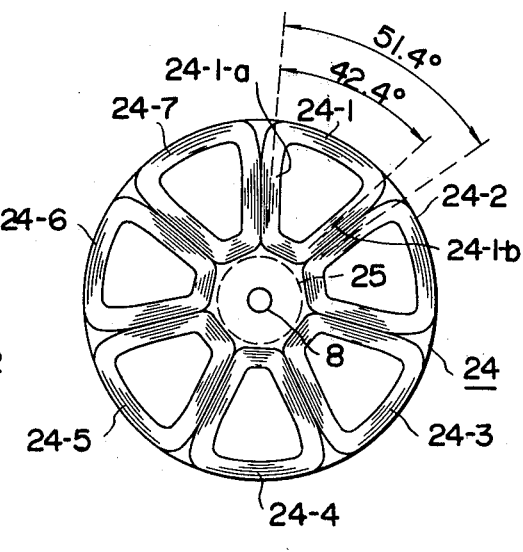
FIGS. 7(b), 7(c) and 7(d) are respectively expanded views of the armatures shown in FIG. 4, FIG. 5 and FIG. 6.
Figure 7B:
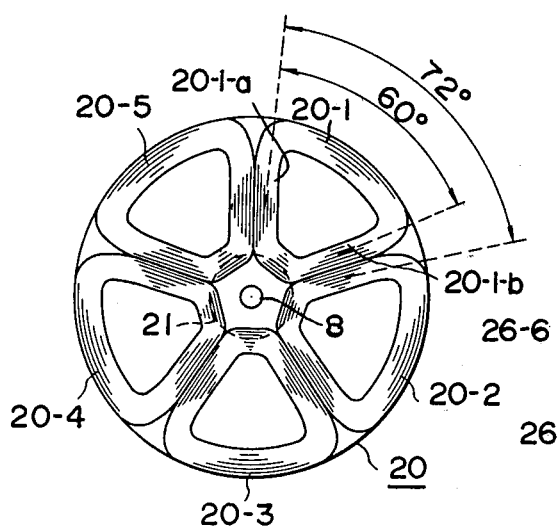

Referring to FIG. 4, there is shown an expanded view of an embodiment of a DC motor comprising a field magnet with 6 ($=2mn$) magnetic poles, 5 ($=m(2n-1)$) armature coils and 15 ($=mn(2n-1)$) commutator segments, where $m=1$ and $n=3$. In this embodiment, only the commutator segments are increased in number in comparison with the example shown in FIG. 1, while the number of the armature coils is decreased in number in comparison with the example shown in FIG. 2. As shown in FIG. 7(a), a field magnet 19 is provided with magnetic poles 19-1, 19-2, ..., 19-6, magnetized alternately to N and S with 60 degree angular intervals in the axial direction of the rotating shaft. The field magnet 19 corresponds to the field magnet 13 shown in FIG. 3. A commutator 21, which serves as power supply control means for the armature, comprises commutator segments 21-1, 21-2, ..., 21-15, with 24 degree angular intervals (2/5 the magnetic pole width) 3 ($=mn$) commutator segments, which are separated by 120 degree ($=360/mn$) angular intervals (2/1 the magnetic pole width), are each electrically short-circuited by electrically conductive short-circuit members. The commutator segments 21-1, 21-6 and 21-11 are short-circuited with each other. Likewise, the commutator segments 21-2, 21-7 and 21-12 are short-circuited with each other; the commutator segments 21-3, 21-8 and 21-13 are short-circuited with each other; the commutator segments 21-4, 21-9 and 21-14 are short-circuited with each other; and the commutator segments 21-5, 21-10 and 21-15 are short-circuited with each other. The commutator 21 corresponds to the commutator 15 shown in FIG. 3. In an armature 20, armature coils 20-1, 20-2, 20-3, 20-4 and 20-5 are arranged as shown in FIG. 7(b) and those armature coils are integrally molded. Each armature coil is arranged adjacent to each other, without overlapping on each other, with an equal pitch of 72 degree angular intervals (6/5 the magnetic pole width). The angular intervals of the conductor portions (in the case of the armature coil 20-1, its conductor portions are portions 20-1-a and 20-1-b), which conductive portions contribute to the generation of torque, are set at 60 degrees so as to be equal to the magnetic pole width. This corresponds to the armature 14 shown in FIG. 3.

Referring back to FIG. 4, one end of the armature coil 20-1 is connected to the commutator segment 21-2, and the other end of the armature coil 20-1 is connected to the commutator segment 21-3. Likewise, the opposite ends of the armature coil 20-2 are each connected to the commutator segments 21-5 and 21-6; the opposite ends of the armature coil 20-3 are each connected to the commutator segments 21-8 and 21-9; the opposite ends of the armature coil 20-4 are each connected to the commutator segments 21-11 and 21-12; and the opposite ends of the armature coil 20-5 are each connected to the commutator segments 21-14 and 21-15. This connection mode is different from the wave winding connection mode or the lap winding connection. However, its characteristics in terms of motor are exactly the same as those of the other connection modes. This applies to other embodiments according to the present invention, which will be described later. Therefore, only one connection method will be explained. Reference numerals 22-1 and 22-2 represent brushes which serves as electric power supply control means. To the brushes 22-1 and 22-2 is power supplied from a positive pole 23-1 and a negative pole 23-2 of DC power source. The angular intervals of the brushes 22-1 and 22-2 are 180 degrees (3/1 the magnetic pole width). However, 60 (=360/2mn) degree angular intervals (equal to the magnetic pole width) or 300 degree angular intervals (5/1 the magnetic pole width) can be equivalently adopted.

Alternative construction is that electrically conductive members for connecting the commutator segments to each other are omitted, and 2mn brushes are arranged so as to slide on the commutator with an angle of 360/2mn degrees and the adjacent brushes are each connected to the positive and negative poles of the DC power source so as to supply power to the armature coils. In the present embodiment, the following modification exhibits exactly the same characteristics as those of the embodiment in which the aforementioned electrically conductive members are employed and the brushes 22-3, 22-4, 22-5 and 22-6 are unnecessary: Of 6 (=2mn) brushes 23-1, 23-2, ..., 23-6, the brushes which are positioned with 60 (=360/2mn) degree angular interval are connected to the positive pole and negative pole of the DC power source and are disposed so as to be capable of sliding on the commutator 21 in such a manner that power is supplied from the positive pole 23-1 of the DC power source to the brushes 23-1, 23-3 and 23-5, and from the negative pole 23-2 to the brushes 23-2, 23-4 and 23-6. This modification can be applied to other embodiments which will be described hereinafter.

In the configuration as shown in FIG. 4, electric current flows in the direction of the arrow and torque is generated in each armature coil, so that the armature 20 and the commutator 21 are respectively rotated in the directions of the arrows A and B. The switching of armature current is performed 30 (=2mn(2n−1)) times per revolution of the armature 20, and torque is successively generated. Thus, the armature 20 and the commutator 21 work as commutator motor.

In the case of the commutator motor, the abovementioned number of the switching of armature current is the number when the angular intervals of the brushes are extremely small. This case does not necessarily correspond to the embodiment shown in FIG. 4. The point where the brushes come into contact with two commutator segments is referred to as singular point. The switching point does not include that singular point. The definitions of the singular point and the switching point apply to other embodiments which will be explained hereinafter.

Figure 5:
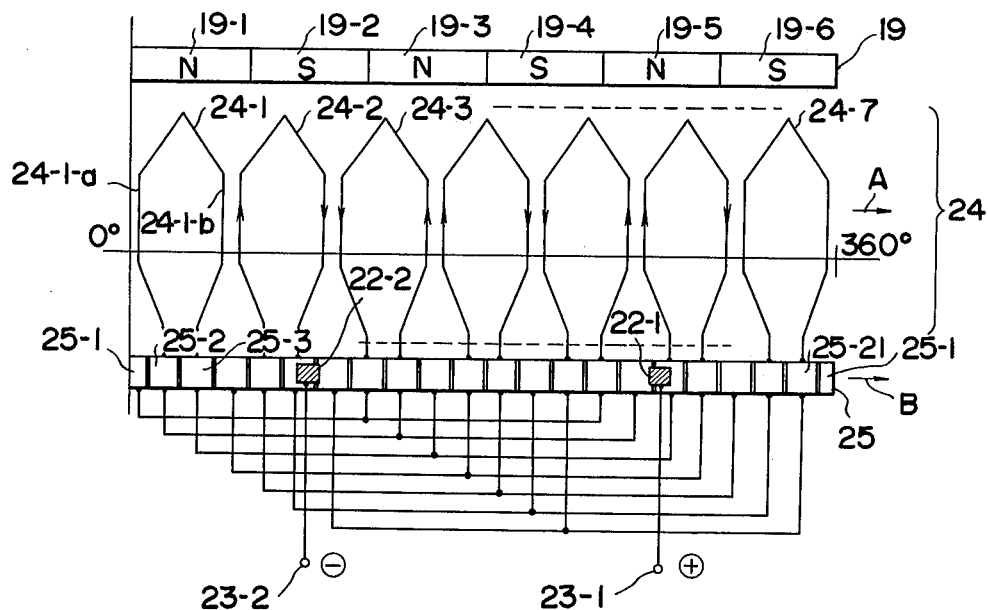
Figure 6:
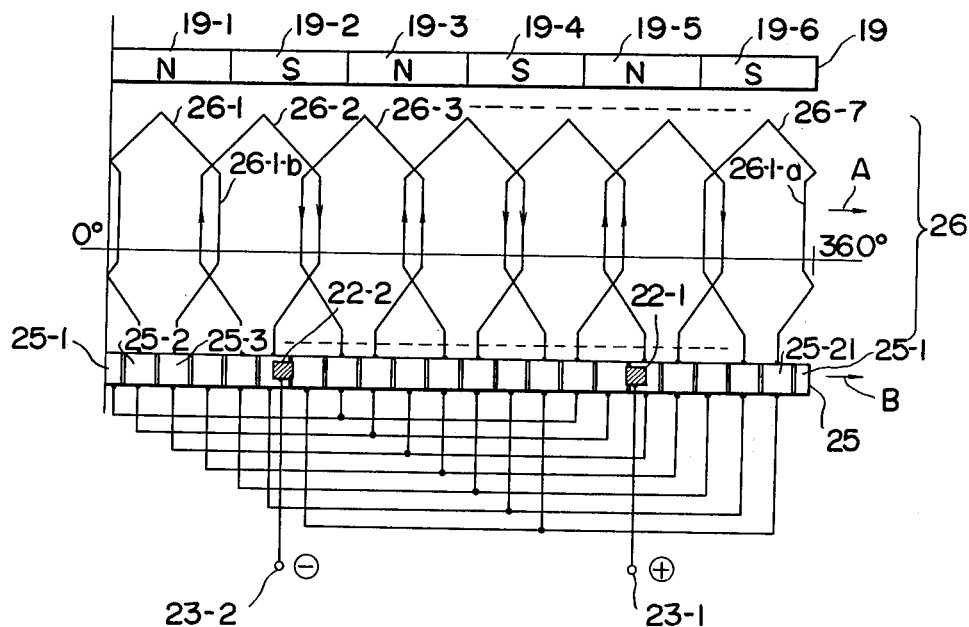
Figure 7D:
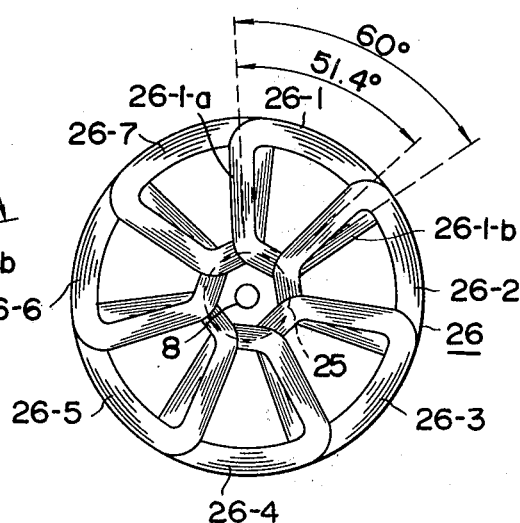

Referring to FIGS. 5 and 6, there is shown an expanded view of an embodiment of a DC motor according to the present invention, comprising a field magnet with 6 (=2mn) magnetic poles, 7 (=m(2n+1)) armature coils and 21 (=mn(2n+1)) commutator segments, where m=1 and n=3. The field magnet 19 is the same as that shown in FIG. 4. A commutator 25 comprises commutator segments 25-1, 25-2, ..., 25-21, with about 17.1 degree angular interval (2/7 the magnetic pole width). 3 (=mn) commutator segments, which are separated by 120 degree (=360/mn) angular intervals (2/1 the magnetic pole width), are each electrically short-circuited by electrically conductive short-circuit members. Specifically, the commutator segments 25-1, 25-8 and 25-15 are short-circuited with each other. Likewise, the commutator segments 25-2, 25-9 and 25-16 are short-circuited with each other; the commutator segments 25-3, 25-10 and 25-17 are short-circuited with each other; the commutator segments 25-4, 25-11 and 25-18 are short-circuited with each other; the commutator segments 25-5, 25-12 and 25-19 are short-circuited with each other; the commutator segments 25-6, 25-13 and 25-20 are short-circuited with each other; and the commutator segments 25-7, 25-14 and 25-21 are short-circuited with each other. The commutator 25 corresponds to the commutator 15 shown in FIG. 3. In an armature 24 shown in FIG. 5, armature coils 24-1, 24-2, ..., and 24-7 are arranged as shown in FIG. 7(c) and those armature coils are integrally molded. Each armature coil is arranged adjacent to each other, without overlapping on each other, with an equal pitch of about 51.4 degree angular intervals (6/7 the magnetic pole width). In this arrangement, the angular intervals of the conductor portions (in the case of the armature coil 24-1, its conductor portions are portions 24-1-a and 24-1-b), which conductive portions contribute to the generation of torque, are slightly smaller than the magnetic pole width as shown in FIG. 5. Due to the smaller angular intervals, this motor has a shortcoming that reverse torque is generated. This shortcoming, however, can be eliminated by conventional countermeasures, such as by (i) making the magnetic pole width substantially equal to the angular intervals of the conductor portions contributing to generation of torque in each armature coil or by (ii) increasing the angular intervals of the brushes. This countermeasure can be applied to other embodiments which will be described later. An armature 26 shown in FIG. 6 comprises armature coils 26-1, 26-2, . . . , 26-7, which are arranged as shown in FIG. 7(d) and are molded integrally. Each armature coil is arranged with an equal pitch of about 51.4 degrees (6/7 the magnetic pole width), partly overlapping on each other. In this arrangement, the angular intervals of the conductor portions (in the case of the armature coil 26-1, its conductor portions are portions 26-1-a and 26-1-b), which conductor portions contribute to the generation of torque in each armature coil, are 60 degrees, which is equal to the magnetic pole width. The armatures 24 and 26 correspond to the armature 14 shown in FIG. 3.

Referring back to FIGS. 5 and 6, one end of each of the armature coils 24-1 and 26-1 is connected to the commutator segment 25-2, and the other end of each of the armature coils 24-1 and 26-1 is connected to the commutator segment 25-3. Likewise, the opposite ends of the armature coils 24-2 and 26-2 are respectively connected to the commutator segments 25-5 and 25-6; the opposite ends of the armature coils 24-3 and 26-3 are respectively connected to the commutator segments 25-8 and 25-9; the opposite ends of the armature coils 25-4 and 26-4 are respectively connected to the commutator segments 25-11 and 25-12; the opposite ends of the armature coils 24-5 and 26-5 are respectively connected to the commutator segments 25-14 and 25-15; the opposite ends of the armature coils 24-6 and 26-6 are respectively connected to the commutator segments 25-17 and 25-18; and the opposite ends of the armature coils 24-7 and 26-7 are respectively connected to the commutator segments 25-20 and 25-21.

The angular intervals and others of the brushes 22-1 and 22-2 are the same as those explained by referring to FIG.4.

In the configuration as shown in FIGS. 5 and 6, electric current flows in the direction of the arrow and torque is generated in each armature coil, so that the armatures 24 and 26 and the commutator 25 are respectively rotated in the directions of the arrows A and B. The switching of armature current is performed 42 (=2mn(2n=1)) times (except the singular point) per revolution, and torque is successively generated. Thus, the armatures 24 and 26 and the commutator 25 work as commutator motor.

Figure 8:
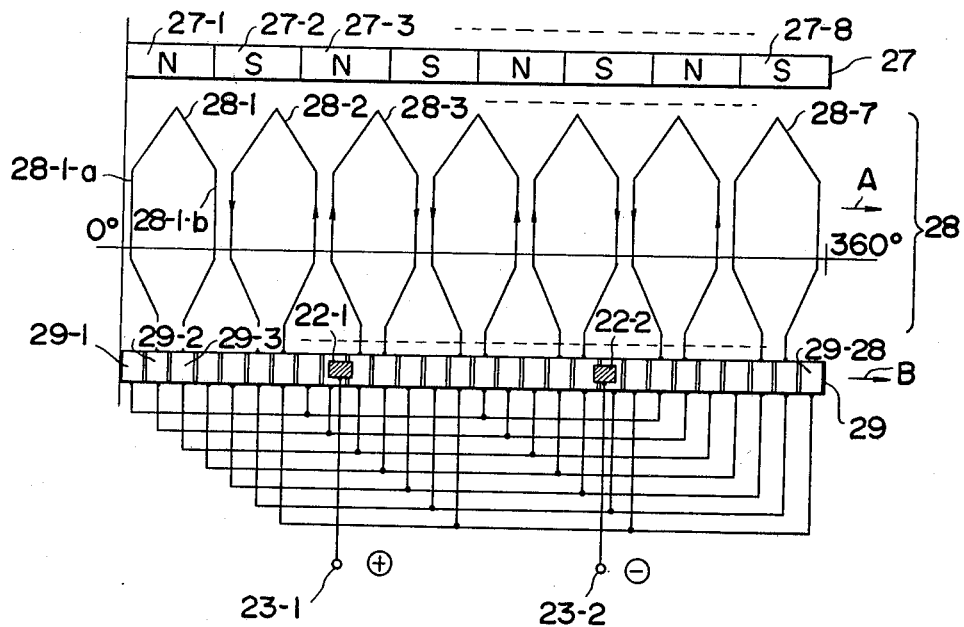
FIGS. 8, 9 and 10 are expanded views of examples of field magnets and armatures for use in a commutator motor according to the present invention.
Figure 11A:
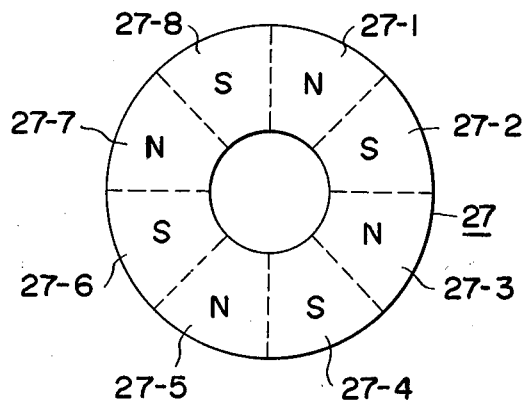
FIG. 11(e) is an expanded view of the field magnets shown in FIGS. 8, 9 and 10.
FIGS. 11(b) and 11(c) are respectively expanded views of the armatures shown in FIG. 9 and FIG. 10.

Referring to FIG. 8, there is shown an expanded view of an embodiment of a DC motor according to the present invention, comprising a field magnet with 8 (=2mn) magnetic poles, 7 (=m(2n−1)) armature coils and 28 (=mn(2n−1)) commutator segments, where m=1 and n=4. As shown in FIG. 11(a), a field magnet 27 is provided with magnetic poles 27-1, 27-2, . . . , and 27-8, magnetized alternately to N and S with 45 degree angular intervals in the axial direction of the rotating shaft. The field magnet 27 corresponds to the field magnet 13 shown in FIG. 3. A commutator 29 comprises commutator segments 29-1, 29-2, . . . , and 29-28 arranged with about 12.9 degree angular intervals (2/7 the magnetic pole width). 4 (=mn) commutator segments, which are separated by 90 degree (=360/mn) angular intervals (2/1 the magnetic pole width), are each electrically short-circuited by electrically conductive short-circuit members. Specifically, the commutator segments 29-1, 29-8, 29-15 and 29-22 are short-circuited with each other. Likewise, the commutator segments 29-2, 29-9, 29-16 and 29-23 are short-circuited with each other; the commutator segments 29-3, 29-10, 29-17 and 29-24 are short-circuited with each other; the commutator segments 29-4, 29-11, 29-18 and 29-25 are short-circuited with each other; the commutator segments 29-5, 29-12, 29-19, and 29-26 are short-circuited with each other; the commutator segments 29-6, 29-13, 29-20, and 29-27 are short-circuited with each other; and the commutator segments 29-7, 29-14, 29-21 and 29-28 are short-circuited with each other. The commutator 29 corresponds to the commutator 15 shown in FIG. 3. In an armature 28, armature coils 28-1, 28-2, . . . , and 28-7 are arranged with exactly the same angular intervals as explained by referring to FIG. 7(c) and those armature coils are integrally molded. Each armature coil is arranged adjacent to each other, without overlapping on each other, with an equal pitch of about 51.4 degree angular intervals (8/7 the magnetic pole width). In this arrangement, the angular intervals of the conductor portions (in the case of the armature coil 28-1, its conductor portions are portions 28-1-a and 28-1-b), which conductor portions contribute to the generation of torque in each armature coil, are slightly smaller than the magnetic pole width as shown in FIG. 8. One end of the armature coil 28-1 is connected to the commutator segment 29-2, and the other end of the armature coil 28-1 is connected to the commutator segment 29-3. Likewise, the opposite ends of the armature coil 28-2 are each connected to the commutator segments 29-6 and 29-7; the opposite ends of the armature coil 28-3 are each connected to the commutator segments 29-10 and 29-11; the opposite ends of the armature coil 28-4 are each connected to the commutator segments 29-14 and 29-15; the opposite ends of the armature coil 28-5 are each connected to the commutator segments 29-18 and 29-19; the opposite ends of the armature coil 28-6 are each connected to the commutator segments 29-22 and 29-23; and the opposite ends of the armature coil 28-7 are each connected to the commutator segments 29-26 and 29-27.

Reference numerals 22-1 and 22-2 represent brushes, to which power is supplied from a positive pole 23-1 and a negative pole 23-2 of DC power source, respectively. The angular intervals of the brushes 22-1 and 22-2 are 135 degrees (3/1 the magnetic pole width). However, 45 (=360/2mn) degree angular intervals (equal to the magnetic pole width), 225 degree angular intervals (5/1 the magnetic pole width) or 315 degree angular intervals (7/1 the magnetic pole width) can be equivalently adopted.

In the configuration as shown in FIG. 8, electric current flows in the direction of the arrow, and torque is generated in each armature coil, so that the armature 28 and the commutator 29 are respectively rotated in the directions of the arrows A and B. The switching of armature current is performed 56 (=2mn(2n−1)) times (except the singular point) per revolution, so that torque is successively generated. Thus, the armature 28 and the commutator 29 work as commutator motor.

Figure 9:
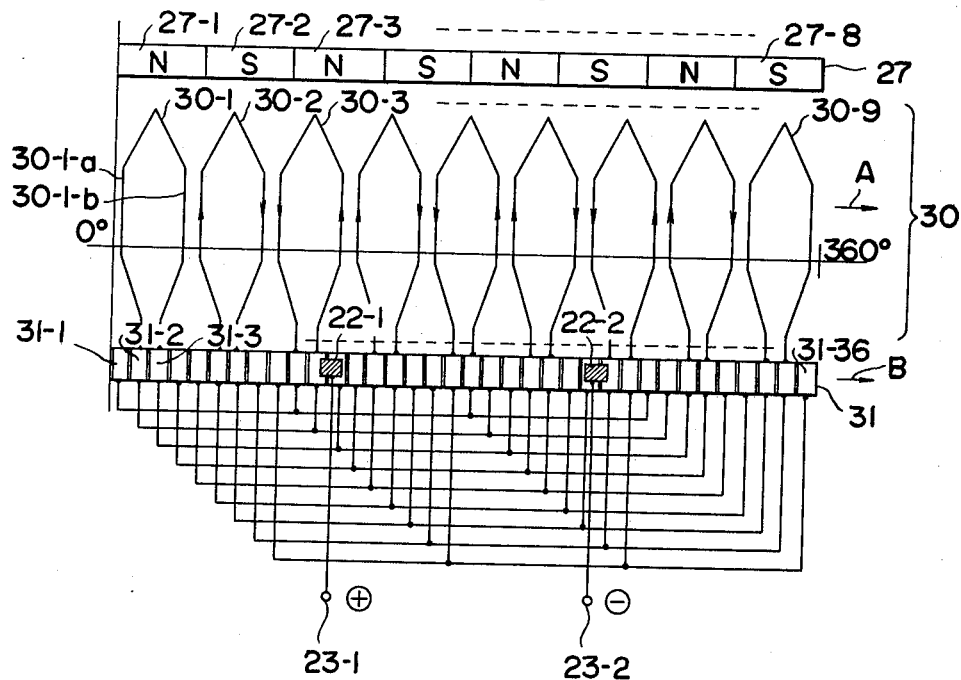
Figure 10:
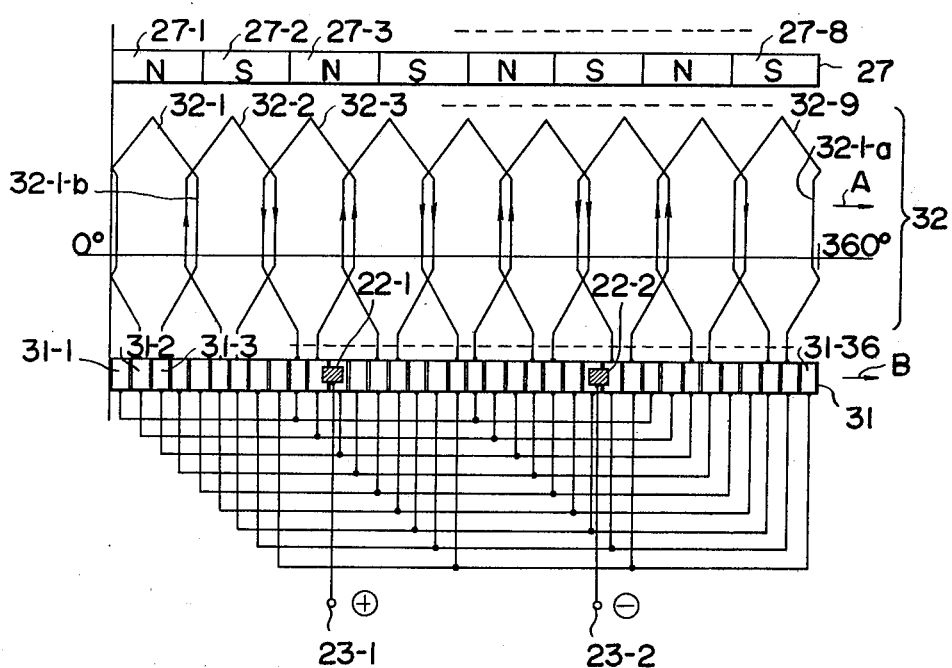
Figure 11B:
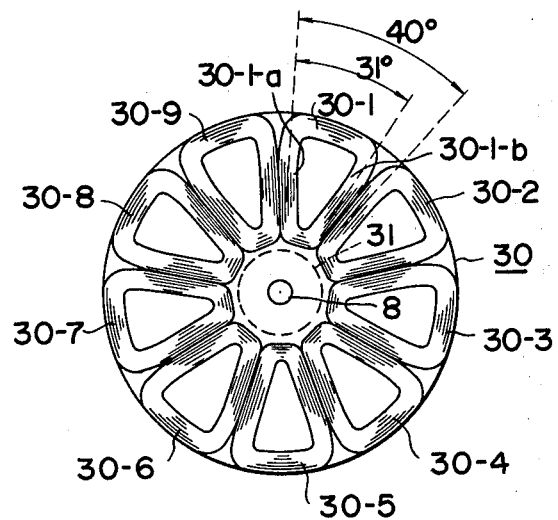
Figure 11C:
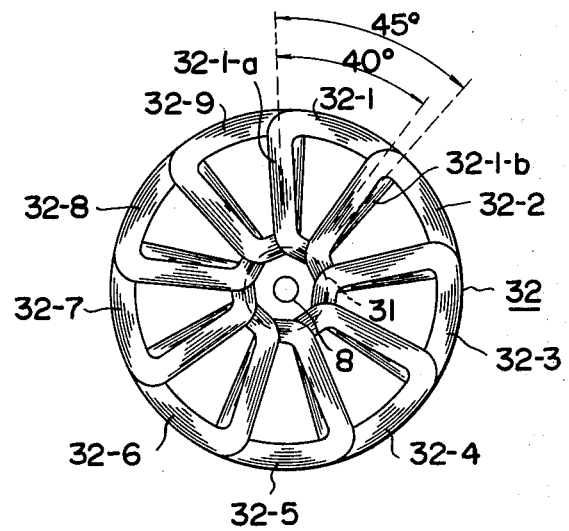

Referring to FIGS. 9 and 10, there is shown an expanded view of an embodiment of a DC motor according to the present invention, comprising a field magnet with 8 (=2mn) magnetic poles, 9 (=m(2n+1)) armature coils and 36 (=mn(2n+1)) commutator segments, where m=1 and n=4. The field magnet 27 is the same as that shown in FIG. 8. A commutator 31 comprises commutator segments 31-1, 31-2, . . . , and 31-36 arranged with 10 degree angular intervals (2/9 the magnetic width). 4 (=mn) commutator segments, which are separated by 90 degree (=360/mn) angular intervals (2/1 the magnetic pole width), are each electrically short-circuited by electrically conductive short-circuit members. Specifically, the commutator segments 31-1, 31-10, 31-19 and 31-28 are short-circuited with each other. Likewise, the commutator segments 31-2, 31-11, 31-20 and 31-29 are short-circuited with each other; the commutator segments 31-3, 31-12, 31-21 and 31-30 are short-circuited with each other; the commutator segments 31-4, 31-13, 31-22 and 31-31 are short-circuited with each other; the commutator segments 31-5, 31-14, 31-23, and 31-32 are short-circuited with each other; the commutator segments 31-6, 31-15, 31-24, and 31-33 are short-circuited with each other; the commutator segments 31-7, 31-16, 31-25 and 31-34 are short-circuited with each other; the commutator segments 31-8, 31-17, 31-26, and 31-35 are short-circuited with each other; and the commutator segments 31-9, 31-18, 31-27, and 31-36 are short-circuited with each other. The commutator 31 corresponds to the commutator 15 shown in FIG. 3. In an armature 30, armature coils 30-1, 30-2, . . . , and 30-9 are arranged as shown in FIG. 11(b) and those armature coils are integrally molded. Each armature coil is arranged adjacent to each other, without overlapping on each other, with an equal pitch of 40 degree angular intervals (8/9 the magnetic pole width). In this arrangement, the angular intervals of the conductor portions (in the case of the armature coil 30-1, its conductor portions are portions 30-1-a and 30-1-b), which conductor portions contribute to the generation of torque in each armature coil, are slightly smaller than the magnetic pole width as shown in FIGS. 9 and 10. An armature 32 shown in FIG. 10 comprises armature coils 32-1, 32-2, . . . , 32-9 which are arranged as shown in FIG. 11(c) and are molded integrally. Each armature coil is arranged with an equal pitch of 40 degrees (8/9 the magnetic pole width), partly overlapping on each other. In this arrangement, the angular intervals of the conductor portions (in the case of the armature coil 32-1, its conductor portions are portions 32-1-a and 32-1-b), which conductor portions contribute to the generation of torque in each armature coil, are 45 degrees, which is equal to the magnetic pole width. The armatures 30 and 32 correspond to the armature 14 shown in FIG. 3. Referring back to FIGS. 9 and 10, one end of each of the armature coils 30-1 and 32-1 is connected to the commutator segment 31-2, and the other end of each of the armature coils 30-1 and 32-1 is connected to the commutator segment 31-3. Likewise, the opposite ends of the armature coils 30-2 and 32-2 are respectively connected to the commutator segments 31-6 and 31-7; the opposite ends of the armature coils 30-3 and 32-3 are respectively connected to the commutator segments 31-10 and 31-11; the opposite ends of the armature coils 30-4 and 32-4 are respectively connected to the commutator segments 31-14 and 31-15; the opposite ends of the armature coils 30-5 and 32-5 are respectively connected to the commutator segments 31-18 and 31-19; the opposite ends of the armature coils 30-6 and 32-6 are respectively connected to the commutator segments 31-22 and 31-23; the opposite ends of the armature coils 30-7 and 32-7 are respectively connected to the commutator segments 31-26 and 31-27; the opposite ends of the armature coils 30-8 and 32-8 are respectively connected to the commutator segments 31-30 and 31-31; and the opposite ends of the armature coils 30-9 and 32-9 are respectively connected to the commutator segments 31-34 and 31-35.

The angular intervals and others of the brushes 22-1 and 22-2 are the same as those explained by referring to FIG. 8.

In the configuration as shown in FIGS. 9 and 10, electric current flows in the direction of the arrow and torque is generated in each armature coil, so that the armatures 30 and 32 and the commutator 31 are respectively rotated in the directions of the arrows A and B. The switching of armature current is performed 72 (=2mn(2n+1)) times (except the singular point) per revolution, and torque is successively generated. Thus, the armatures 30 and 32 and the commutator 31 work as commutator motor.

Figure 12:
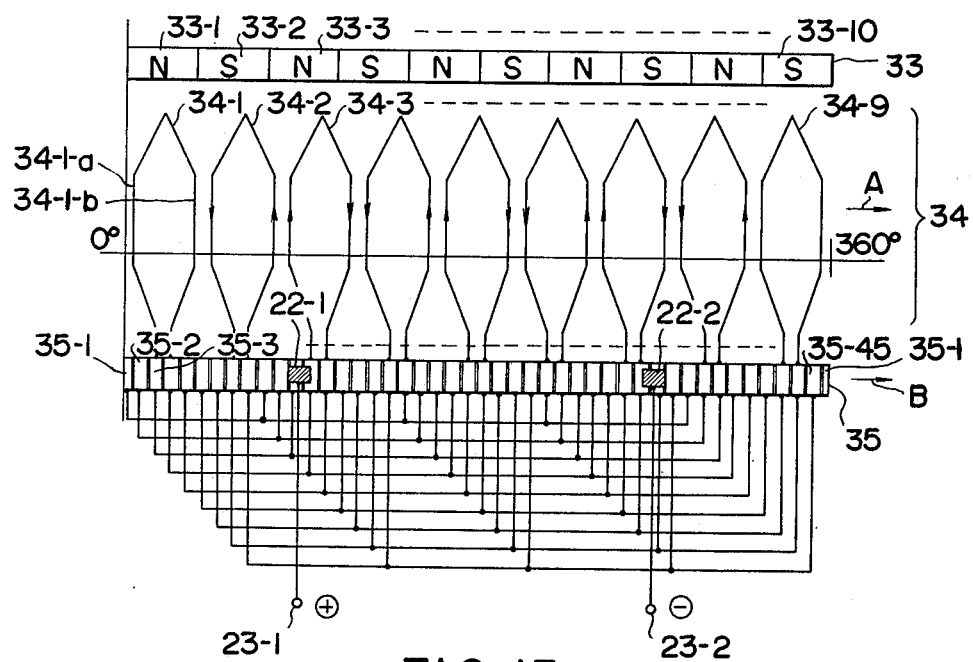
FIGS. 12, 13 and 14 are expanded views of examples of field magnets and armatures for use in a commutator motor according to the present invention.
Figure 15A:
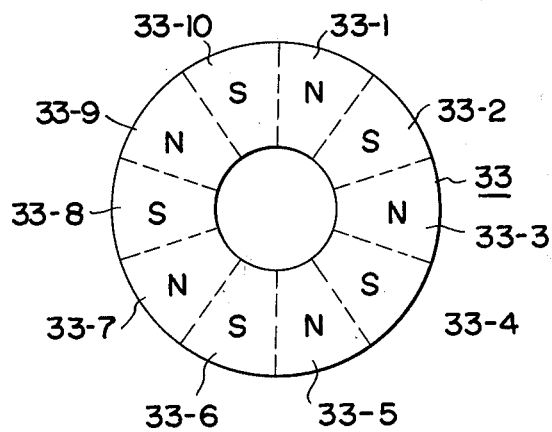
FIG. 15(a) is an expanded view of the field magnets shown in FIGS. 12, 13 and 14.

Referring to FIG. 12, there is shown an expanded view of an embodiment of a DC motor according to the present invention, comprising a field magnet with 10 (=2mn) magnetic poles, 9 (=m(2n−1)) armature coils and 45 (=mn(2n−1)) commutator segments, where m=1 and n=5. As shown in FIG. 15(a), a field magnet 33 is provided with magnetic poles 33-1, 33-2, . . . , and 33-10, magnetized alternately to N and S with 36 degree angular intervals in the axial direction of the rotating shaft. The field magnet 33 corresponds to the field magnet 13 shown in FIG. 3.

A commutator 25 comprises commutator segments 35-1, 35-2, . . . , and 35-45 arranged with 8 degree angular intervals (2/9 the magnetic pole width). 5 (=mn) commutator segments, which are separated by 72 degree (=360/mn) angular intervals (2/1 the magnetic pole width), are each electrically short-circuited by electrically conductive short-circuit members. Specifically, the commutator segments 35-1, 35-10, 35-19, 35-28 and 35-37 are short-circuited with each other. Likewise, the commutator segments 35-2, 35-11, 35-20, 35-29 and 35-38 are short-circuited with each other; the commutator segments 35-3, 35-12, 35-21, 35-30 and 35-39 are short-circuited with each other; the commutator segments 35-4, 35-13, 35-22, 35-31 and 35-40 are short-circuited with each other; the commutator segments 35-5, 35-14, 35-23, 35-32 and 35-41 are short-circuited with each other; the commutator segments 35-6, 35-15, 35-24, 35-33 and 35-42 are short-circuited with each other; the commutator segments 35-7, 35-16, 35-25, 35-34 and 35-43 are short-circuited with each other; the commutator segments 35-8, 35-17, 35-26, 35-35 and 35-44 are short-circuited with each other; and the commutator segments 35-9, 35-18, 35-27, 35-36 and 35-45 are short-circuited with each other. The commutator 35 corresponds to the commutator 15 shown in FIG. 3. In an armature 34, armature coils 34-1, 34-2, . . . , and 34-9 are arranged with exactly the same angular intervals as explained by referring to FIG. 11(b) and those armature coils are integrally molded. Each armature coil is arranged adjacent to each other, without overlapping on each other, with an equal pitch of 40 degree angular intervals (10/9 the magnetic pole width). In this arrangement, the angular intervals of the conductor portions (in the case of the armature coil 34-1, its conductor portions are portions 34-1-a and 34-1-b), which conductor portions contribute to the generation of torque in each armature coil, are slightly smaller than the magnetic pole width as shown in FIG. 12. One end of the armature coil 34-1 is connected to the commutator segment 35-3, and the other end of the armature coil 34-1 is connected to the commutator segment 35-4. Likewise, the opposite ends of the armature coil 34-2 are each connected to the commutator segments 35-8 and 35-9; the opposite ends of the armature coil 34-3 are each connected to the commutator segments 35-13 and 35-14; the opposite ends of the armature coil 34-4 are each connected to the commutator segments 35-18 and 35-19;

the opposite ends of the armature coil 34-5 are each connected to the commutator segments 35-23 and 35-24; the opposite ends of the armature coil 34-6 are each connected to the commutator segments 35-28 and 35-29; the opposite ends of the armature coil 34-7 are each connected to the commutator segments 35-33 and 35-34; the opposite ends of the armature coil 34-8 are each connected to the commutator segments 35-38 and 35-39; and the opposite ends of the armature coil 34-9 are each connected to the commutator segments 35-43 and 35-44.

Reference numerals 22-1 and 22-2 represent brushes, to which power is supplied from a positive pole 23-1 and a negative pole 23-2 of DC power source, respectively. The angular intervals of the brushes 22-1 and 22-2 are 180 degrees (5/1 the magnetic pole width). However, 36 (=360/2mn) degree angular intervals (equal to the magnetic pole width), 108 degree angular intervals (3/1 the magnetic pole width), 252 degree angular intervals (7/1 the magnetic pole width) or 324 degree angular intervals (9/1 the magnetic pole width) can be equivalently adopted.

In the configuration as shown in FIG. 12, electric current flows in the direction of the arrow, and torque is generated in each armature coil, so that the armature 34 and the commutator 35 are respectively rotated in the directions of the arrows A and B. The switching of armature current is performed 90 (=2mn(2n−1)) times (except the singular point) per revolution, so that torque is successively generated. Thus, the armature 34 and the commutator 35 work as commutator motor.

Figure 13:
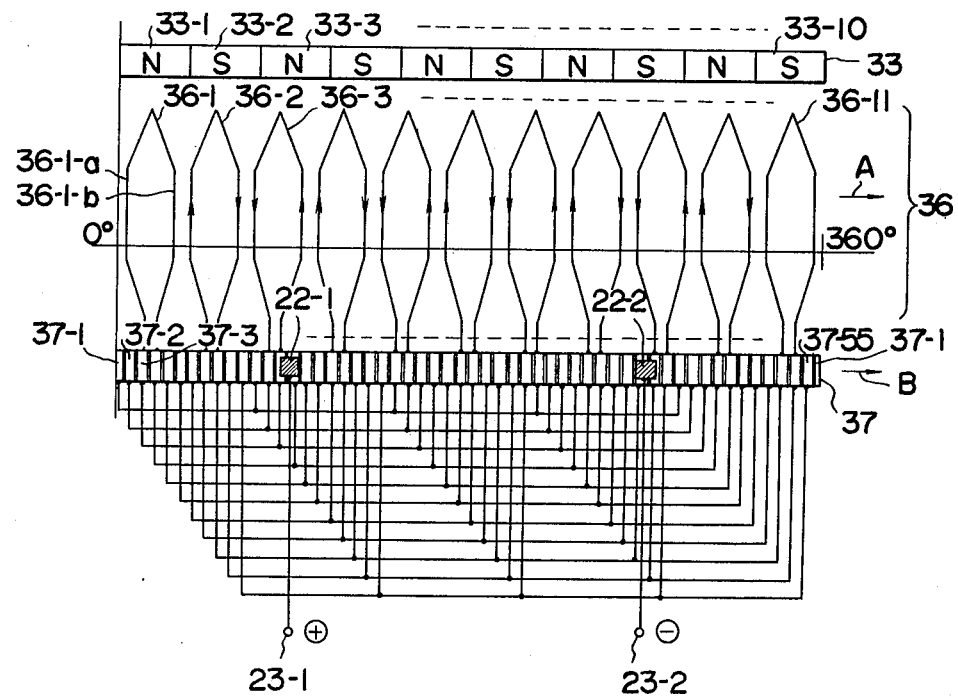
Figure 14:
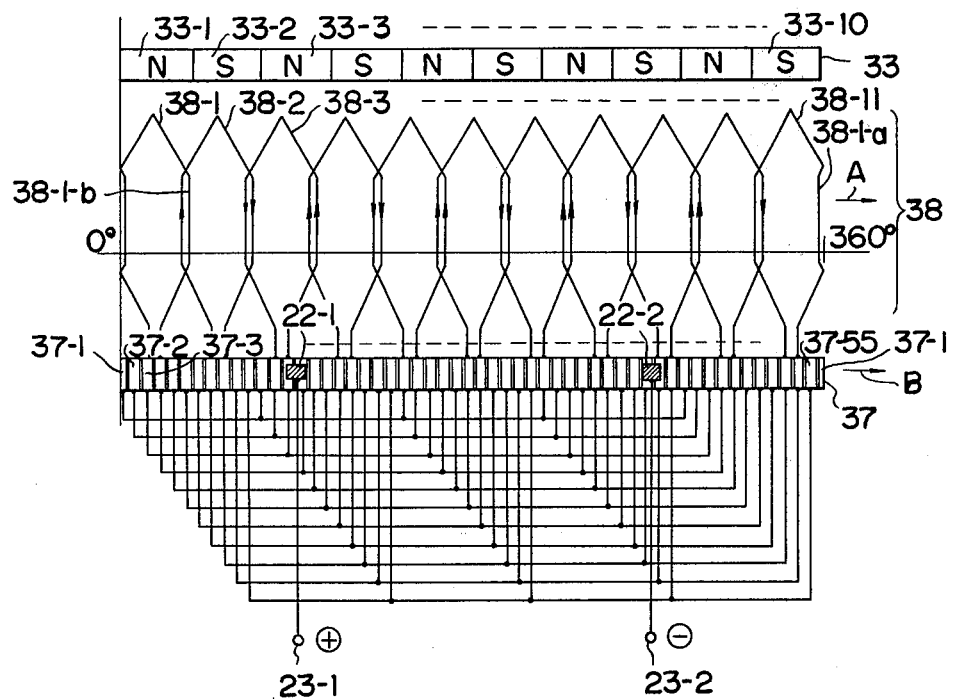
Figure 15B:
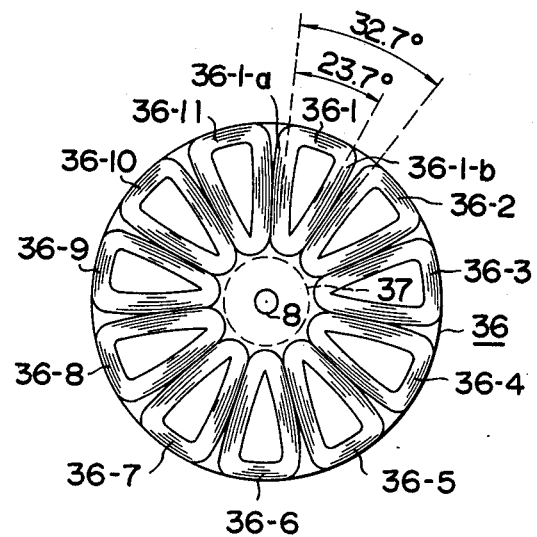
FIGS. 15(b) and 15(c) are respectively expanded views of the armatures shown in FIG. 13 and FIG. 14.
Figure 15C:
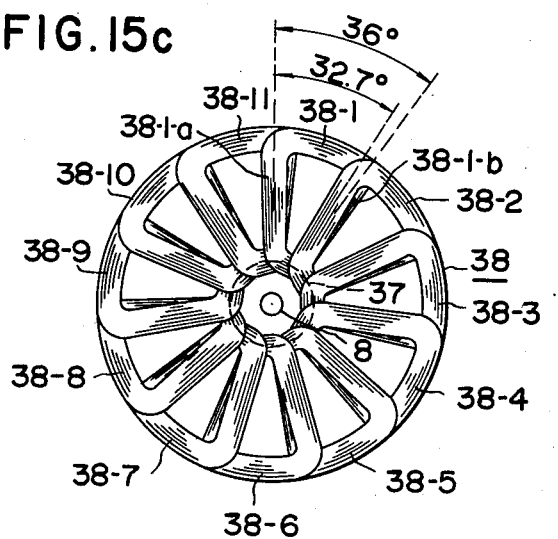

Referring to FIGS. 13 and 14, there is shown an expanded view of an embodiment of a DC motor according to the present invention, comprising a field magnet with 10 (=2mn) magnetic poles, 11 (=m(2n+1)) armature coils and 55 (=mn(2n+1)) commutator segments, where m=1 and n=5. The field magnet 33 is the same as that shown in FIG. 12. A commutator 37 comprises commutator segments 37-1, 37-2, . . . , and 37-55 arranged with about 6.5 degree angular interval (2/11 the magnetic pole width). 5 (=mn) commutator segments, which are separated by 72 degree (=360/mn) angular intervals (2/1 the magnetic pole width), are each electrically short-circuited by electrically conductive short-circuit members. Specifically, the commutator segments 37-1, 37-12, 37-23, 37-34 and 37-45 are short-circuited with each other. Likewise, the commutator segments 37-2, 37-13, 37-24, 37-35 and 37-46 are short-circuited with each other; the commutator segments 37-3, 37-14, 37-25, 37-36 and 37-47 are short-circuited with each other; the commutator segments 37-4, 37-15, 37-26, 37-37 and 37-48 are short-circuited with each other; the commutator segments 37-5, 37-16, 37-27, 37-38 and 37-49 are short-circuited with each other; the commutator segments 37-6, 37-17, 37-28, 37-39 and 37-50 are short-circuited with each other; the commutator segments 37-7, 37-18, 37-29, 37-40 and 37-51 are short-circuited with each other; the commutator segments 37-8, 37-19, 37-30, 37-41 and 37-52 are short-circuited with each other; the commutator segments 37-9, 37-20, 37-31, 37-42 and 37-53 are short-circuited with each other; the commutator segments 37-10, 37-21, 37-32, 37-43 and 37-54 are short-circuited with each other; and the commutator segments 37-11, 37-22, 37-33, 37-44 and 37-55 are short-circuited with each other. The commutator 37 corresponds to the commutator 15 shown in FIG. 3. In an armature 36, armature coils 36-1, 36-2, . . . , and 36-11 are arranged as shown in FIG. 15(*b*) and those armature coils are integrally molded. Each armature coil is arranged adjacent to each other, without overlapping on each other, with an equal pitch of about 32.7 degree angular intervals (10/11 the magnetic pole width). In this arrangement, the angular intervals of the conductor portions (in the case of the armature coil 36-1, its conductor portions are portions 36-1-*a* and 36-1-*b*), which conductor portions contribute to the generation of torque in each armature coil, are slightly smaller than the magnetic pole width as shown in FIGS. 13 and 14. An armature 38 shown in FIG. 14 comprises armature coils 38-1, 38-2, . . . , and 38-11 which are arranged as shown in FIG. 15(*c*) and are molded integrally. Each armature coil is arranged with an equal pitch of about 32.7 degree (10/11 the magnetic pole width), partly overlapping on each other. In this arrangement, the angular intervals of the conductor portions (in the case of the armature coil 38-1, its conductor portions are portions 38-1-*a* and 38-1-*b*), which conductor portions contribute to the generation of torque in each armature coil, are 36 degrees, which is equal to the magnetic pole width. The armatures 36 and 38 correspond to the armature 14 shown in FIG. 3. Referring back to FIGS. 13 and 14, one end of each of the armature coils 36-1 and 38-1 is connected to the commutator segment 37-3, and the other end of each of the armature coils 36-1 and 38-1 is connected to the commutator segment 37-4. Likewise, the opposite ends of the armature coils 36-2 and 38-2 are respectively connected to the commutator segments 37-8 and 37-9; the opposite ends of the armature coils 36-3 and 38-3 are respectively connected to the commutator segments 37-13 and 37-14; the opposite ends of the armature coils 36-4 and 38-4 are respectively connected to the commutator segments 37-18 and 37-19; the opposite ends of the armature coils 36-5 and 38-5 are respectively connected to the commutator segments 37-23 and 37-24; the opposite ends of the armature coils 36-6 and 38-6 are respectively connected to the commutator segments 37-28 and 37-29; the opposite ends of the armature coils 36-7 and 38-7 are respectively connected to the commutator segments 37-33 and 37-34; the opposite ends of the armature coils 36-8 and 38-8 are respectively connected to the commutator segments 37-38 and 37-39; the opposite ends of the armature coils 36-9 and 38-9 are respectively connected to the commutator segments 37-43 and 37-44; the opposite ends of the armature coils 36-10 and 38-10 are respectively connected to the commutator segments 37-48 and 37-49; and the opposite ends of the armature coils 36-11 and 38-11 are respectively connected to the commutator segments 37-53 and 37-54. The commutator 37 corresponds to the commutator 15 shown in FIG. 3. The angular intervals and others of the brushes 22-1 and 22-2 are the same as those explained by referring to FIG. 12.

In the configuration as shown in FIGS. 13 and 14, electric current flows in the direction of the arrow and torque is generated in each armature coil, so that the armatures 36 and 38 and the commutator 37 are respectively rotated in the directions of the arrows A and B. The switching of armature current is performed 110 (=2mn(2n+1)) times (except the singular point) per revolution, and torque is successively generated. Thus, the armatures 36 and 38 and the commutator 37 work as commutator motor.

Figure 16:
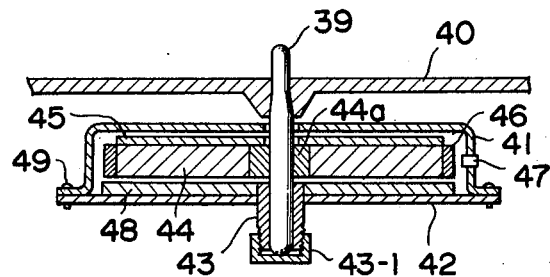
FIG. 16 is an explanatory view of a semiconductor motor according to the present invention.

Referring to FIG. 16, there is shown an explanatory view of the structure of a semiconductor motor provided with a disc-shaped armature. In the figure, a bearing 43 is fixed to a casing 42 made of press-formed soft steel. Further, a casing 41 made of press-formed soft steel is secured to the casing 42 by screws 49. A rotating shaft 39 for supporting a turntable 40 is rotatably supported by the bearing 43. To the rotating shaft 39 is fixed a magnet rotor 44 through a magnet holder 44a. Around the peripheral surface of the magnet rotor 44, there is fixed a ring-shaped position sensing indication band 46. The magnet rotor 44, which serves as a field magnet, is magnetized with magnetic poles N and S located in the axial direction of the rotating shaft 39. A disc member 45 made of soft steel, forming a magnetic circuit, is attached to the upper surface of the magnet rotor 44. An armature 48 is attached to the inner surface of the casing 42, so that the armature 48 is positioned in the field air gap between the casing 42 and the magnet rotor 44. Reference numeral 47 indicates a support member for a position sensor, which support member is held in a vacant portion formed in the casing 41. In an outer peripheral lower portion of the bearing 43, there is formed a screw portion in which the rotating shaft 39 is screwed through an internal thread 43-1, so that the position of the rotating shaft 39 can be adjusted in the thrust direction.

Figure 17:
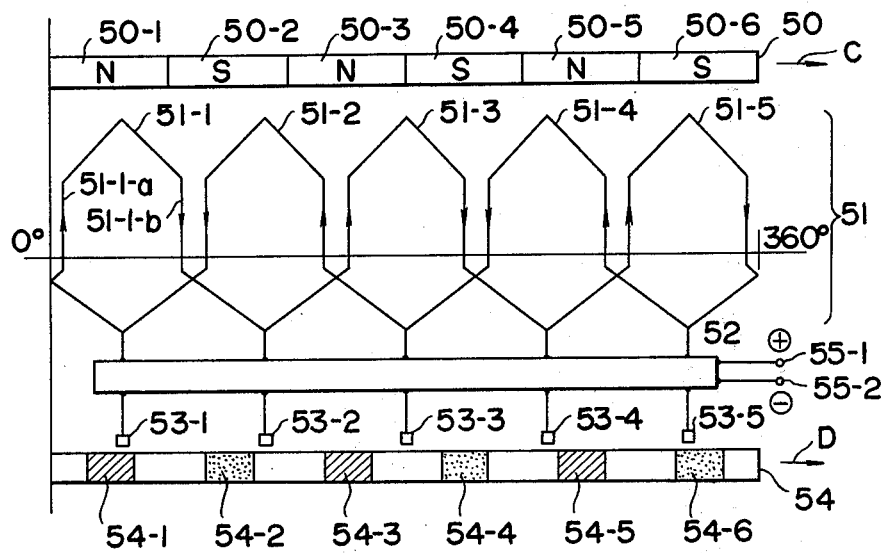
FIG. 17 is an expanded view of the field magnet and armature employed in the semiconductor motor shown in FIG. 16.

Referring to FIG. 17, a semiconductor motor provided with the above-described disc-shaped armature, to which the present invention is applied, will now be explained. In this figure, there is shown an expanded view of an embodiment of a semiconductor motor comprising a field magnet with 6 (=2mn) magnetic poles, 5 (=m(2n−1)) armature coils and power supply control means capable of performing the switching of armature current 30 (=2mn(2n−1)) times per revolution (except the singular point), where m=1 and n=3.

A magnet rotor 50, which serves as a field magnet, includes magnetic poles 50-1, 50-2, . . . , and 50-6, magnetized to N and S with angular intervals of 60 degrees in the axial direction of the rotating shaft. The magnet rotor 50 is rotated in the direction of the arrow C, which magnet rotor 50 corresponds to the magnet rotor 44 shown in FIG. 16.

In an armature 51, armature coils 51-1, 51-2, 51-3, 51-4 and 51-5 are arranged with exactly the same angular intervals as shown in FIG. 7(b), so that the armature 51 constitutes a stator. Specifically, each armature coil is arranged adjacent to each other, with an angular pitch of 72 degree angular intervals (6/5 the magnetic pole width), without overlapping on each other.

The angular intervals of the electrically conductor portions (in the case of the armature coil 50-1, its conductor portions are portions 50-1-a and 50-1-b), contributing to the generation of torque in each armature coil, are 60 degrees, which is equal to the magnetic pole width, corresponding to the armature 48 as shown in FIG. 16.

These armature coils are connected in series with each other. The connection portions of the armature coils 51-1 and 51-3, of the armature coils 51-3 and 51-5, of the armature coils 51-5 and 51-2, of the armature coils 51-2 and 51-4, and of the armature coils 51-4 and 51-1 are connected to a positive pole 55-1 and a negative pole 55-2 of a DC power source through an electric power supply control circuit 52, which is conventionally used as electric power supply control means. Reference numerals 53-1, 53-2, 53-3, 53-4 and 53-5 indicate position sensors. As the position sensors, for instance, Hall devices, induction coils or the like can be employed. The angular intervals of the position sensors are 72 degrees, corresponding to the 6/5 the magnetic pole width. The position sensors 53-1, 53-2, 53-3, 53-4 and 53-5 are held in the support member 47 as shown in FIG. 16 and are directed towards the position sensing indication band 46. When Hall devices are employed as position sensors, the outward leaked magnetic flux of the magnetic poles 50-1, 50-2, . . . , and 50-6 of the magnet rotor 50 can be utilized. Reference numeral 54 indicates a position sensing indication member including N poles shown by shaded portions 54-1, 54-3 and 54-5 and with N poles shown by dotted portions 54-2, 54-4 and 54-6, which position sensing indication member 54 corresponds to the position sensing indication band 46 as shown in FIG. 16.

When the Hall devices 53-1, 53-2, 53-3, 53-4 and 53-5 faces the S poles, the corresponding transistors (not shown) in the first series included in the power supply control circuit 52 are made conductive by the detection output of the Hall devices, so that the armature coils corresponding to the positive pole 55-1 of DC power source are made conductive. Furthermore, when the Hall devices 53-1, 53-2, 53-3, 53-4 and 53-5 faces the N poles, the corresponding transistors (not shown) in the second series included in the power supply control circuit 52 are made conductive by the detection output of the Hall devices, so that the armature coils corresponding to the negative pole 55-2 of DC power source are made conductive. By such conduction, the armature current is controlled.

Specifically, in the configuration as shown in FIG. 17, by the output of the Hall device 53-5 which faces the S pole, its counterpart transistor in the first series (not shown) is made conductive, so that the connecting portions of the positive pole 55-1 of the DC power source and of the armature coils 51-4 and 51-1 are made conductive.

Furthermore, by the output of the Hall device 53-1 facing the N pole, its counterpart transistor in the second series (not shown) is made conductive, so that the connecting portions of the negative pole 55-2 of the DC power source and of the the armature coils 55-1 and 55-2 are made conductive. As a result, electric current flows in the direction of the arrow and torque is generated in each armature coil, so that the magnet rotor 50 and the position sensing indication band 54 are respectively rotated in the direction of the arrows C and D. Thus, the switching of armature current is performed 30 (=2mn(2n−1)) times per revolution and, accordingly, torque for rotation is successively generated. In the case of the semiconductor motor, the above-mentioned switching number of armature current signifies the number when all armature coils are made conductive, and the point in which the armature coils are short-circuited is referred to as the singular point, which is excluded from the above-mentioned switching number.

This power supply method is exactly the same as that in the conventional semiconductor motors and the magnet rotor 50 and the position sensing indication band 54 are respectively rotated in the directions of the arrows C and D, constituting a semiconductor motor.

In this embodiment, the field magnet has 6 magnetic poles and the number of the armature coils is 5. As a matter of course, the other embodiments according to the present invention can be applied to semiconductor motors.

In all the embodiments so far explained, the present invention is applied to the disc-shaped armatures. By its nature, the present invention can be applied to cylindrical armatures and core armatures.

As mentioned previously, the object of the present invention can be attained with respect to motors provided with a field magnet having 2mn magnetic poles, m(2n±1) armature coils and power supply control means capable of performing the switching of armature current 2mn(2n±1) times per revolution.

Therefore, in addition to the above-described embodiments, the present invention can be applied to a motor having a field magnet with 12 magnetic poles and 11 or 13 armature coils, or a motor having a field magnet with 13 or 15 armature coils.

Furthermore, in all the above-described embodiments, m=1. However, even if the number of magnetic poles of the field magnet and the number of armature coils are each multiplied by (an integer) x m, all the armature coils can be arranged with an equal pitch and the thickness of the armature can be reduced, whereby DC motors with high torque, high motor efficiency and high commutating characteristics can be obtained.

Thus, there is provided in accordance with the invention a DC motor which has the advantages discussed above. The embodiments described are intended to be merely exemplary and those skilled in the art will be able to make variations and modifications in them without departing from the spirit and scope of the invention. All such modification and variations are contemplated as falling within the scope of the claims.

What is claimed is:

1. A direct current motor for imparting continuous rotation comprising:
   a field magnet having a circular array of 2mn magnetic poles magnetized with the same magnetic intervals as those of magnetic poles N and S, where m is an integer of 1 or more and n is an integer of 3 or more;
   an armature with a circular array of m(2n±1) armature coils arranged with equal pitch;
   means for mounting said field magnet and armature for relative rotation in coaxial juxtaposition; and
   electric power supply control means including means for supplying armature drive current to said armature coils and means for switching said armature current 2mn (2n±1) times per revolution of the armature with respect to the field magnet.

2. A direct current motor as claimed in claim 1, wherein said electric power supply control means is provided with:
   mn(2n±1) commutator segments, which constitute a commutator; and
   short-circuiting means for connecting the terminals of said armature coils to predetermined said commutator segments corresponding to said armature coils, and for short-circuiting mn commutator segments of said commutator segments each, which mn commutator segments are separated with angular intervals of 360/mn degrees, which is two times the magnetic pole width of said magnetic poles, power being supplied to said armature coils from positive and negative poles of DC power source via brushes which move in sliding contact with said commutator segments, and the angular intervals of said brushes on said commutator segments being equal to the angular intervals of the magnetic pole width of said magnetic poles, 360/2mn degrees.

3. A direct current motor as claimed in claim 1, wherein said electric power supply control means is provided with:
   mn (2n±1) commutator segments, which constitute a commutator, said coils being interconnected with corresponding segments; and
   2mn brushes mounted in fixed relation with said field magnet, which are arranged so as to move in sliding contact with said commutator, with the angular intervals of 360/2mn degrees, which is equal to the magnetic pole width of said field magnet, and means for supplying power to said armature coils by connecting said brushes which are positioned adjacent to each other.

4. A direct current motor as claimed in claim 1, wherein said electric power supply control means comprises:
   position sensor means for producing an output indicative of the angular position of said armature in relation to said magnet; and
   power supply control circuit means for controlling armature current in accordance with the output obtained from said position sensor means.

* * * * *

UNITED STATES PATENT AND TRADEMARK OFFICE
CERTIFICATE OF CORRECTION

PATENT NO. : 4,437,029
DATED : March 13, 1984
INVENTOR(S) : Itsuki Ban; Manabu Shiraki It is certified that error appears in the above-identified patent and that said Letters Patent are hereby corrected as shown below:

Column 7, line 41, change "(=2mn(2n=1)), to --(=2mn(2n + 1))--.

Signed and Sealed this

Sixteenth Day of October 1984

[SEAL]

Attest:

GERALD J. MOSSINGHOFF

Attesting Officer

Commissioner of Patents and Trademarks